(12) United States Patent
Dygert

(10) Patent No.: US 6,473,441 B1
(45) Date of Patent: Oct. 29, 2002

(54) MULTI-CHANNEL VIDEO PUMP

(75) Inventor: Timothy W. Dygert, Columbia City, IN (US)

(73) Assignee: Escient Convergence Corp, Indianapolis, IN (US)

( * ) Notice: Subject to any disclaimer, the term of this patent is extended or adjusted under 35 U.S.C. 154(b) by 0 days.

(21) Appl. No.: 09/226,169

(22) Filed: Jan. 7, 1999

Related U.S. Application Data

(60) Provisional application No. 60/112,866, filed on Dec. 18, 1998.

(51) Int. Cl.[7] .................................................. H04J 3/06
(52) U.S. Cl. ..................... 370/516; 370/437; 370/468; 370/537; 348/465; 709/217; 709/236
(58) Field of Search ................................ 370/437, 465, 370/468, 516, 537, 538, 540, 543, 544, 545; 348/7, 465; 709/203, 217, 219, 236

(56) References Cited

U.S. PATENT DOCUMENTS

| 5,561,791 A | | 10/1996 | Mendelson et al. | ......... 395/550 |
| 5,603,058 A | * | 2/1997 | Belknap et al. | |
| 5,646,676 A | | 7/1997 | Dewkett et al. | ............... 348/7 |
| 5,699,362 A | | 12/1997 | Makam | ..................... 370/437 |
| 5,974,503 A | * | 10/1999 | Venkatesh et al. | |
| 6,181,711 B1 | * | 1/2001 | Zhang et al. | |

* cited by examiner

Primary Examiner—Dang Ton
Assistant Examiner—Shick Hom

(57) ABSTRACT

A system for streaming a plurality of video or other recorded signals from storage to receiving devices maintains each of the signal streams at their encoded bit rate. The bit rate of each stream is detected from the stored signals and a corresponding queue is set up in a network interface card for outputting data at the detected bit rate. A channel timing module in the signal streaming device contains pairs of counters, one pair for each stream. The primary counter in each pair is set to have a period slightly less than the period of the stored signal. A secondary counter in each pair is set to have a period that is larger than an integer multiple of the primary counter by an amount equal to the difference between the multiple periods of the primary counter and the same multiple of the stored signals. Every time either the primary or the secondary counter times out, a packet of data is sent to the corresponding queue in the network interface. As a result, the network interface is able to output isochronous signals with an average bit rate within one bit per second of desired bit rates between one megabit/second and 20 megabit/second and with a jitter of less than one millisecond.

4 Claims, 11 Drawing Sheets

20 MHz counter    2 packets    secondary at 500 KHz

| req'd rate | primary count | primary rate | delta rate | packet slip (sec) | secondary count | secondary rate | final rate | error |
|---|---|---|---|---|---|---|---|---|
| 6000000 | 10027 | 5999801 | 199.4615 | 15.08061 | 7,540,304 | 199.4614541 | 6000000 | 0 |
| 5999999 | 10027 | 5999801 | 198.4615 | 15.1566 | 7,578,298 | 198.4614541 | 5999999 | 0 |
| 1500000 | 40107 | 1499988 | 12.46665 | 241.2837 | 120,641,856 | 12.46665171 | 1500000 | 0 |
| 1500001 | 40107 | 1499988 | 13.46665 | 223.3666 | 111,683,292 | 13.46665171 | 1500001 | 0 |
| 750000 | 80214 | 749993.8 | 6.233326 | 482.5674 | 241,283,712 | 6.233325853 | 750000 | 0 |
| 740000 | 81298 | 739993.6 | 6.396221 | 470.2777 | 235,138,831 | 6.396221309 | 740000 | 0 |
| 700000 | 85943 | 699998.8 | 1.163562 | 2585.165 | 1,292,582,720 | 1.1635561896 | 700000 | 0 |
| 650000 | 92554 | 649998.9 | 1.08045 | 2784.024 | 1,392,012,160 | 1.080450332 | 650000 | 0 |
| 503231 | 119548 | 503228.8 | 2.171412 | 1385.274 | 692,636,763 | 2.17141232 | 503231 | 0 |
| 500001 | 120320 | 500000 | 1 | 3008 | 1,504,000,000 | 1 | 500001 | 0 |
| 284001 | 211831 | 284000 | 1.018883 | 2952.253 | 1,476,126,340 | 1.018882977 | 284001 | 0 |
| 500000 | 120320 | 500000 | 0 | #DIV/0! | #DIV/0! | #DIV/0! | #DIV/0! | #DIV/0! |
| 147899 | 406765 | 147898.7 | 0.336152 | 8948.324 | 4,474,162,139 | 0.336152324 | 147899 | 0 |
| 3000021 | 20054 | 2999900 | 120.7307 | 24.91495 | 12,457,475 | 120.730727 | 3000021 | 0 |

FIG. 7

MULTI-CHANNEL VIDEO PUMP

CROSS-REFERENCE TO RELATED APPLICATION

This application is related to U.S. Provisional Application Ser. No. 60/112,866, entitled Multi-Channel Video Pump, by Timothy W. Dygert, filed Dec. 18, 1998 and incorporated herein by reference.

BACKGROUND OF THE INVENTION

1. Field of the Invention

The present invention is directed to streaming video signals and, more particularly, for an apparatus for simultaneously streaming user-specified video files encoded at varying bit rates over a single network.

2. Description of the Related Art

The role of streaming video in local area networks is expected to increase rapidly in the near future. When video that has been compressed using one of the standards of the Moving Pictures Expert Group (MPEG) and stored in a RAID array, or on a digital video (or versatile) disc (DVD), etc., a constant bit rate (or isochronous) stream is created. If a plurality of such streams are to be multiplexed for transmission over a network, as the number of concurrent video streams in a given network segment increases it is essential that each stream be well-behaved in order to maximize network efficiency. Bursty transmission of MPEG video streams in the network will result in congestion and network failure much more quickly than constant bit rate transmission. The more closely the individual data streams are maintained at a constant bit rate, the higher the total aggregate of such streams that can be carried on the network while maintaining a desired quality of service.

The MPEG compression standards are used worldwide for constant bit rate digital video encoding. Decoding of MPEG video relies on the ability to deliver each bit from the encoder to the decoder with a constant delay. This constant bit rate delivery is generally termed Isochronous Streaming. In live broadcasts the encoder is responsible for generating the MPEG bit stream at the proper rate. However, when this information is stored for later playback another mechanism is required to "meter" the data from the storage media to the network connection. Normally, no feedback is provided to the sender by the receiver of MPEG video. The receiver depends on the transmission rate to be both smooth and accurate in order to decode MPEG video properly.

Existing MPEG videos have been encoded at several different rates. Some examples are streams that are 3.282, 3.420, 6.144, and 6.000 megabits per second. Some conventional systems use a handshake protocol to inform the receiving device what is the bit rate of the video stream that will be sent. However, that requires the receiving device to be programmed to use the protocol. Other systems distribute large continuous "chunks" of data that require the receiving device to have enough expensive video memory to buffer the data for smooth display and the ability to determine the appropriate bit rate independently of the rate at which the data is received.

SUMMARY OF THE INVENTION

It is an object of the present invention to provide a video streaming device that can output video signals at an average rate within one bit per second of the rate at which the signal was encoded, for a varying signal rates.

It is another object of the present invention to provide a video streaming device that can output signals with different signal rates, each having a jitter of less than one millisecond.

It is a further object of the present invention to provide a video streaming device capable of outputting multiple video signals at varying rates using close to full maximum payload of the network that receives the video signals.

It is yet another object of the present invention to provide a video streaming device capable of outputting video signals to display devices with as little as one or two frames of video memory and without using a handshake protocol.

The above objects can be attained by an apparatus for These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 7 is a table of data rates, counter values, and timing accuracy for a test of the present invention.

DESCRIPTION OF THE PREFERRED EMBODIMENTS

Figure 1:
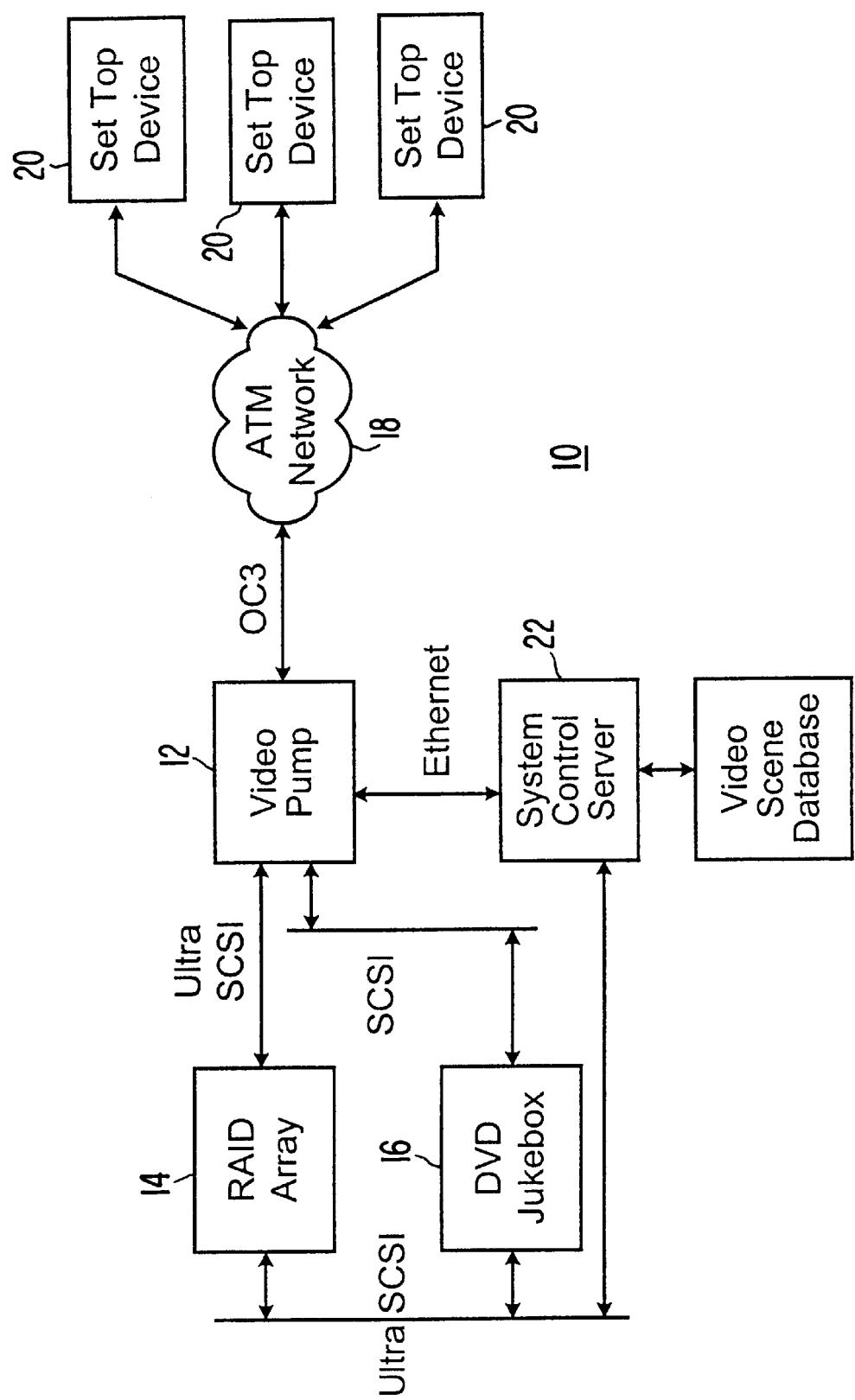
FIG. 1 is a block diagram of a digital media retrieval system using the present invention.

Illustrated in FIG. 1 is a block diagram of digital media retrieval system 10 using the present invention. The implementation of the video pump described herein uses an Asynchronous Transfer Mode (ATM) network that is able to support multiple constant bit rate streams per segment as well as the bursty traffic created by more traditional network traffic. The present invention is not limited to use with ATM networks, but could be used with any network that can deliver similar amounts of data at a sufficiently precise rate. For example, new protocols for TCP/UDP over switched and gigabit Ethernet networks may eventually support the required quality of service, but presently an Ethernet network would be able to transmit a smaller number of high quality video streams per network segment than ATM.

The digital media retrieval system 10 illustrated in FIG. 1 provides interactive distribution of video, text, graphics, and Internet content over a high speed digital network. Video pump 12 is a key component in this system. Its purpose is to retrieve MPEG audio/video streams from various storage devices, such as RAID array 14 and DVD jukebox 16 and place this data into the high speed digital network 18 for distribution to set top devices 20 at the specific rate required for each stream. Channels are opened in the system illustrated in FIG. 1 to transport data from the storage devices 14, 16 to set top devices 20 via the ATM network. These channels may be PVC or SVC channels, such as CBR PVC 6 Mbps channels. The video pump 12 responds to system commands from system control server 22 for the retrieval and distribution of this data. This data is isochronous data including both audio and video. For simplicity's sake, this data will subsequently be referred to as either video or simply as data.

The ATM network 18 is able to establish end to end connections with guaranteed bandwidth availability and requires that data is introduced to the network 18 in such a way that the established connection rate is not exceeded. If the bit rate of a specific connection exceeds that agreed to when the connection was established the network 18 may discard the excess data. Data is introduced into ATM network 18 in units called cells which are 53 bytes long. To properly shape the data as it is introduced into the network, the interface may provide a traffic shaping mechanism. The specifics of how this mechanism works vary but in general constant bit rates are provided with some level of granularity. For a network interface running at OC-3 speed (roughly 155 megabits/sec) this granularity will be no better than about 40,000 bits/sec. At a rate of 6 megabits/sec and assuming 30 frames per second, this granularity in the worst case would cause a full frame over-run or under-run every 5 seconds which is unacceptable for playback of high quality video. Thus, it is not possible to rely on the inherent traffic shaping mechanism of the ATM interface alone. The present invention uses an additional timing mechanism in conjunction with the ATM interface to provide streaming that meets all required specifications for bit rates between roughly 1 and 20 megabits per second.

Video pump 12 provides the following basic functions.
real-time video streaming from RAID array
unidirectional (read only) streaming
OC-3 output to ATM switch
support of multiple channel streaming
Ultra SCSI connection to RAID array
SCSI connection to DVD Jukebox
Video pump 12 supports the following basic commands:
open channel
close channel
play
stop
pause
fast forward
rewind
PCR based channel timing
Video pump 12 has the following features:
PCI/Compact PCI card implementation
use of standard off the shelf hardware and software
Max 80 channels of simultaneous real-time video streaming
arbitrary rates for each of 80 channels with 1 Hz resolution
120 Mbit aggregate throughput (sustained)
OC-3c 155 Mbps ATM interface
UNI 3.1 ATM signaling
AAL5
support of PVC and SVC channels
support of CBR traffic
highly integrated design
unified design environment
real time processes/real time OS (ex: VxWorks)

Video pump 12 may be strictly a server, with commands received via the IMDS protocol over TCP/IP. These commands open and close video streams, assign video streams to specific PVC/SVC channels, and perform actions on these video streams, such as pause, play, stop, fast forward, rewind, etc. Video pump 12 receives the start and stop addresses of the data within a given file that is to be streamed through ATM network 18. Video pump 12 provides timing to allow each individual channel to be streamed at unique, arbitrary rates. A maximum of 80 channels may be streamed, with a maximum total aggregate bandwidth of 120 Mbps. The timing for each channel may be specified via the application program interface (API) executing on system control server 22 or set top device 20, or read directly from the stream itself. In the latter case, a program clock reference (PCR) is stored in MPEG data once per minute. Thus, video pump 12 can determine the bit rate of the signal can be determined by the number of bits between PCRs. Video pump 12 can operate on blocks of data as small as 2 MPEG Transport Packets (376 bytes) to minimize jitter imposed by the distribution of video within the system and to comply with ATM Forum requirements for MPEG2 transmission.

Figure 2:
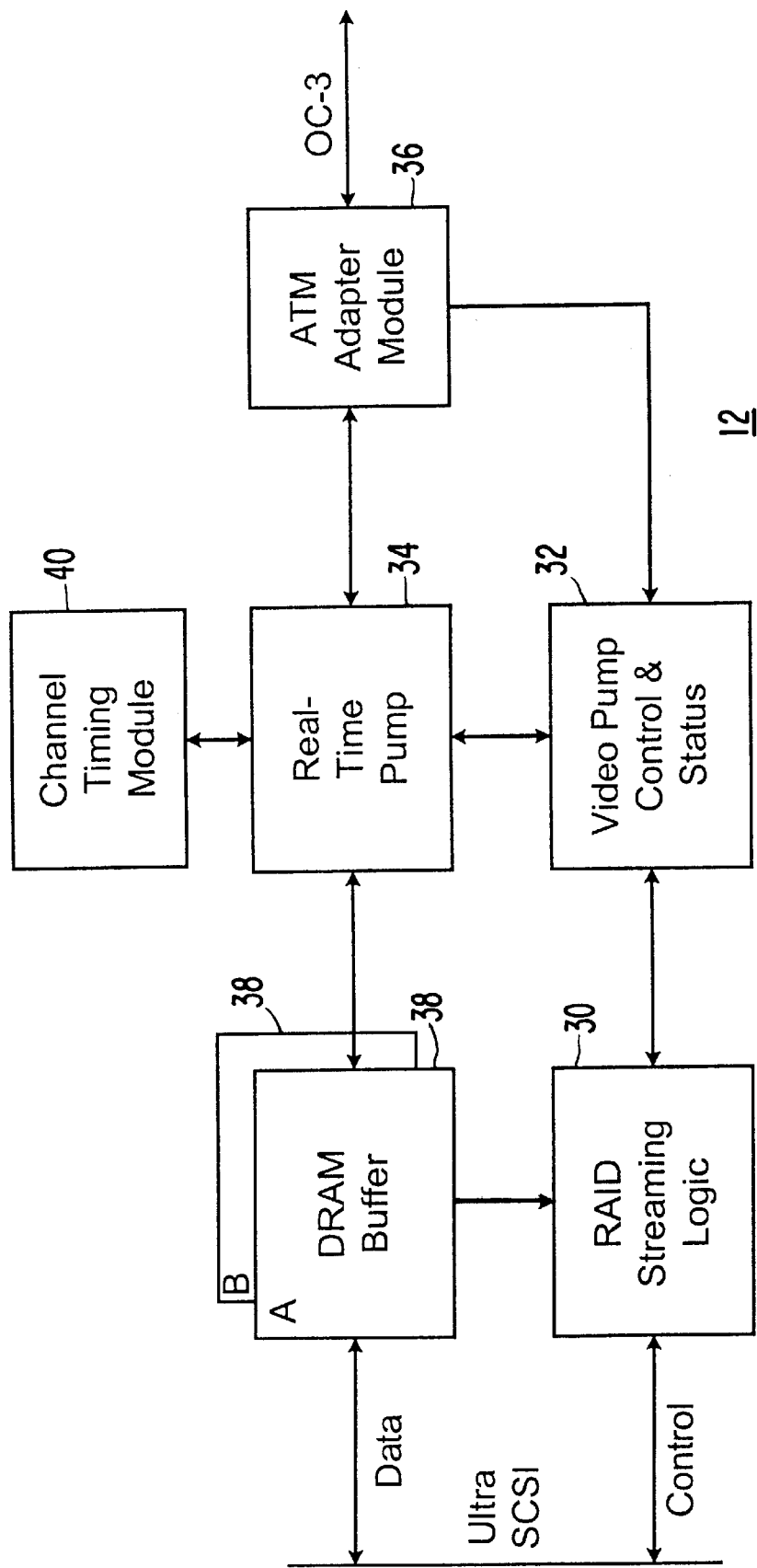
FIG. 2 is a functional block diagram of a video streaming device according to the present invention.

A functional block diagram of video pump 12 is shown in FIG. 2. Video pump 12 has four main functional components: RAID streaming logic 30, video pump control and status 32, real-time pump 34, and ATM adapter 36. These four sections operate as individual processes. These processes and the interaction between them will be explored in detail below. A functional block diagram of the interactions between some of the functional blocks in FIG. 2 is provided in FIG. 3.

RAID streaming logic 30 fetches data from RAID array 14. This data is placed in a DRAM buffer 38 where it is read by real-time pump 34. RAID streaming logic 30 receives start and stop commands, as well data addresses from video pump control and status 32. RAID streaming logic 30 preferably reads data including PCRs from the video file to determine the encode rate, and passes this rate on to real-time pump 34. The encode rate is the rate at which the set top device decoder will use the data, and it is therefore the rate at which video pump 12 must send the data to the decoder, as described in more detail below. RAID streaming logic 30 also ensures that the data being read from RAID array 14 is transport packet aligned. This is crucial to the operation of video pump 12, and any errors are immediately reported to control and status logic 32.

Real-time pump 34 is the heart of video pump 12. It is here that the data for each channel is pulled from the DRAM buffers 38 for each channel at the specified rate. Data for each channel is passed from real-time pump 34 to buffers in ATM adapter module 36 for insertion into ATM distribution network 18. In an exemplary design described below, real-time pump 34 is capable of maintaining 80 separate video streams, each with arbitrary data rates, and processes the data flow in such a manner to minimize jitter as the data is placed in the stream. Real-time pump 34 is capable of maintaining an aggregate data flow bandwidth of 120 Mbps.

ATM adapter module 36 receives the video data from real-time pump 34, packetizes this data into ATM packets, and passes this data stream on to ATM network 18 for distribution to set top devices 20. The data received from real-time pump 34 is in the form of MPEG transport stream packets, and the ATM encapsulation is performed according to AAL5. The output of ATM adapter module 36 is coupled to OC-3c fiber.

A network interface device traffic shaper in ATM adapter module 36 is initialized so that for the current channel it will introduce data into the network at the closest rate to the required rate that is higher than the required rate. Channel timing module 40 provides a signal to transfer the data block to the network interface device traffic shaper in ATM adapter module 36. The result is that each block of data is introduced to the network at a rate that is faster than desired. However, because only data that has been transferred to the network interface device can be sent, from time to time there will be no data available to the traffic shaper. This will result in no data being sent until the next block of data is made available. The resulting data stream will consist of a period when data is being sent too fast followed by a period in which no data is sent. Over time, the exact data rate will be achieved to the accuracy of the channel timing module 40.

If real-time pump 34 is the heart of a video streaming device according to the present invention, then control & status logic 32 serves as the brains for video pump 12 by coordinating and directing all internal elements and processes. Control & status logic 32 provides the interface to the "outside world", receiving commands and passing status to other elements within digital media retrieval system 10. Control & status logic 32 processes these system level commands, generating local commands as required to the other functional elements of video pump 12.

Figure 3:
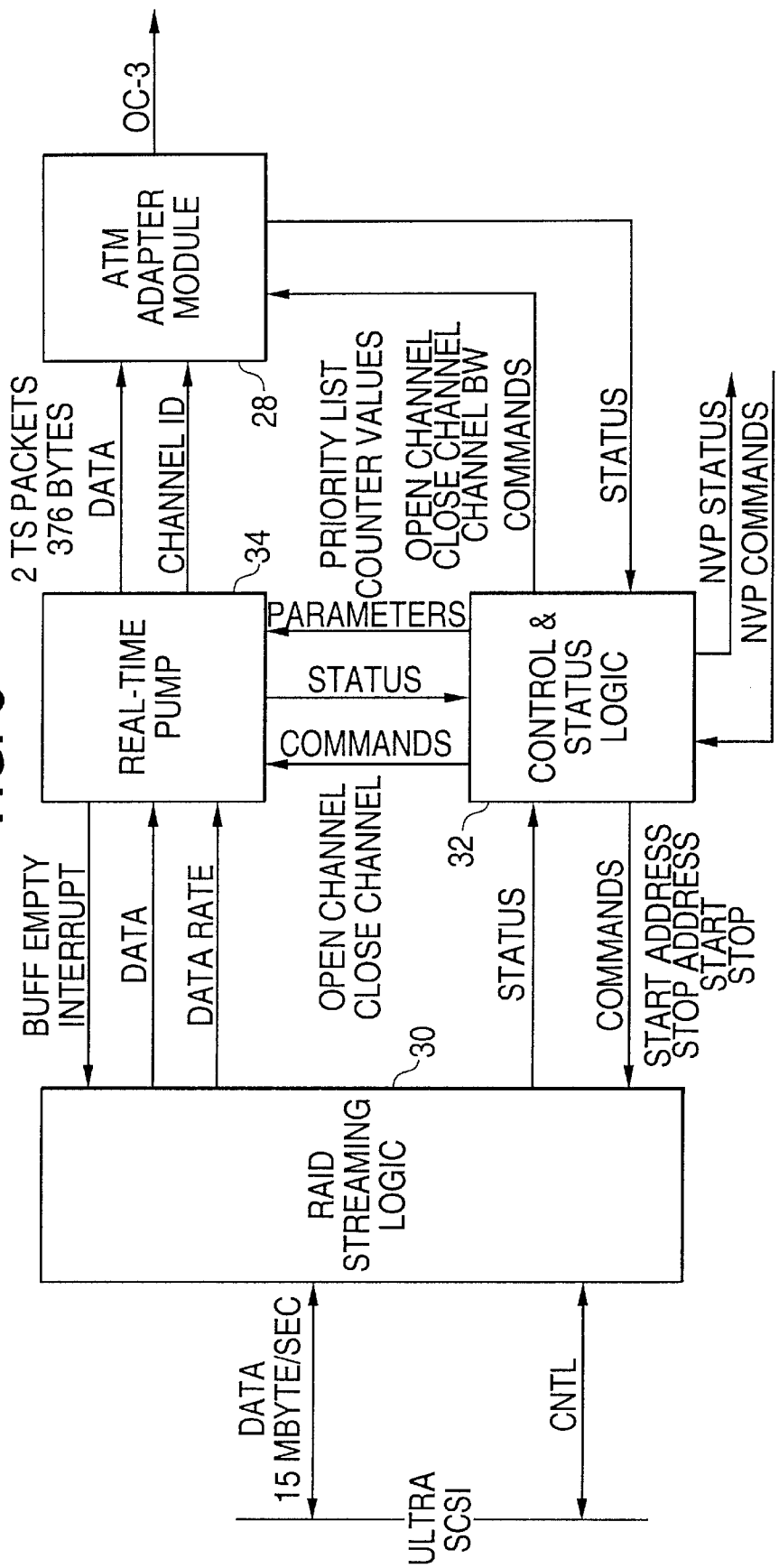
FIG. 3 is a functional block diagram of portions of a video streaming device according to the present invention showing interaction of the functional modules.
Figure 4:
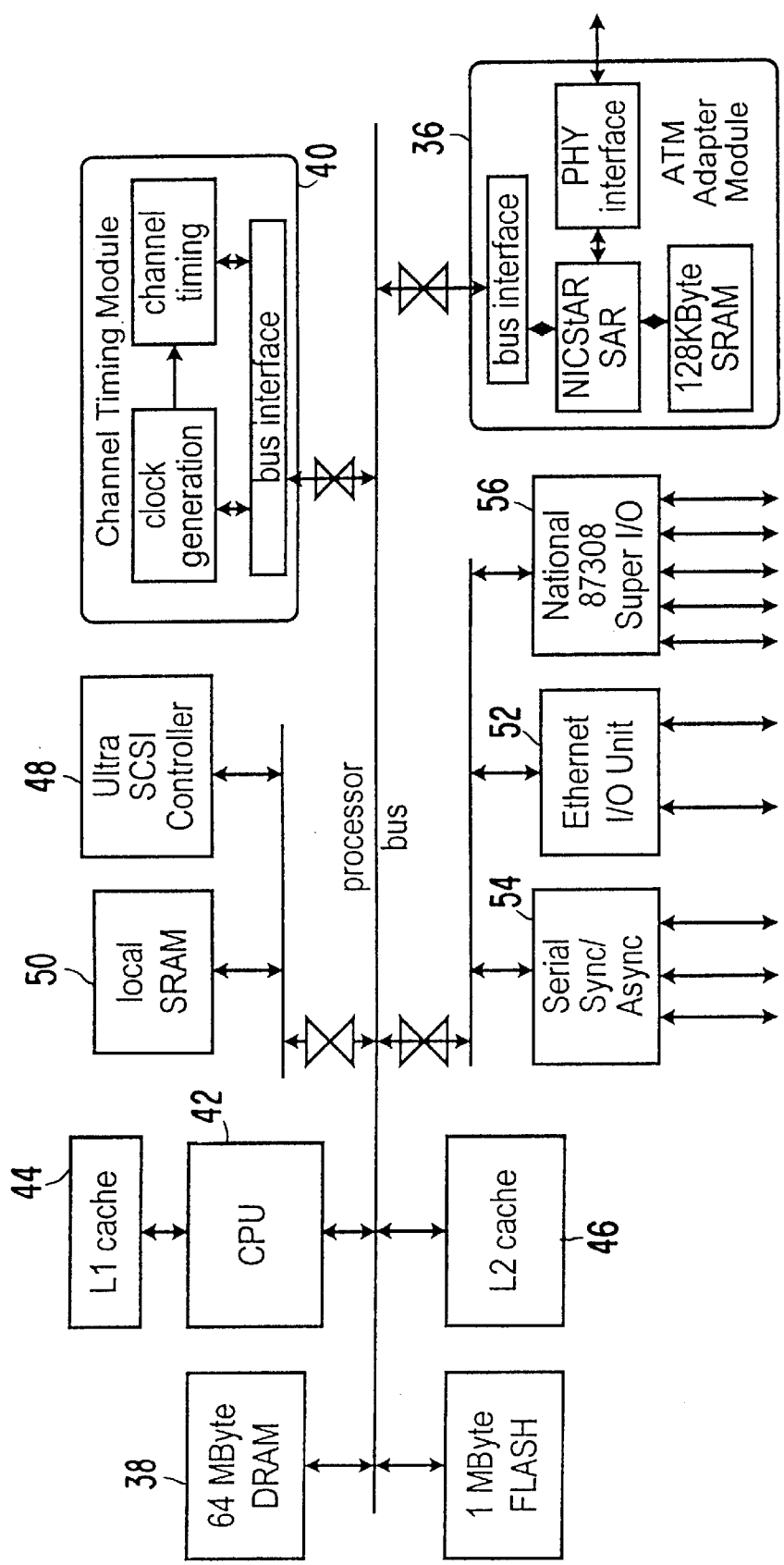
FIG. 4 is a block diagram of the hardware architecture of a video streaming device according to the present invention.

A block diagram of the hardware architecture of a video streaming device (video pump) according to the present invention is illustrated in FIG. 4. Physically, video pump 12 may be constructed on a single Compact PCI card, with PMC modules for channel timing 40 and an ATM adapter module 36 providing an OC-3 interface. The video pump functionality is implemented via software which executes on this Compact PCI card. As will be apparent to one of ordinary skill in the art, the components illustrated in FIG. 4 can be replaced with different components capable of performing the functions illustrated in FIGS. 2 and 3 with greater or less capacity, depending on the requirements of the system in which they operate.

Some of the component illustrated in FIG. 4 have a direct correspondence with the functional block diagrams in FIGS. 2 and 3, but others perform functions for more than one functional block in FIGS. 2 and 3. ATM adapter module 36 may be a Radstone PMCATMF or equivalent device for interfacing between the processor bus and an ATM network. DRAM buffers 38 may be provided by a conventional DRAM chip of, e.g., 64 megabytes. Channel timing module 40 is described in more detail below. The remaining blocks in FIG. 4 perform the functions of real-time pump 34 and control and status logic 34.

Processor 42 controls the operation of video pump 12 and may, for example, be a 200 MHZ RISC processor with both L1 cache 44 and L2 cache 46. Ultra SCSI controller 49 provides an interface to RAID array 14 and DVD jukebox 16 and uses local SRAM 50. Other interface devices, such as an Ethernet I/O unit 52 and serial sync/async I/O unit 54 provide both 10 baseT and 100 baseT Ethernet connections for, e.g., system control server 22, and RS-232 and RS-422 connections. A National 87308 super I/O unit 56 may be used to provide connections to a keyboard, mouse, and other peripheral devices. Other interface units using industry standard interfaces, such as IEEE 1394, or proprietary interfaces may also be included.

Channel timing module 40 generates the timing required for maintaining data rates for each channel output from video pump 12. Channel timing module 40 is preferably a hardware module, a PMC module/daughtercard that resides on the video pump processor card. An overview of the concept and design of channel timing module 40 is provided below.

Figure 5:
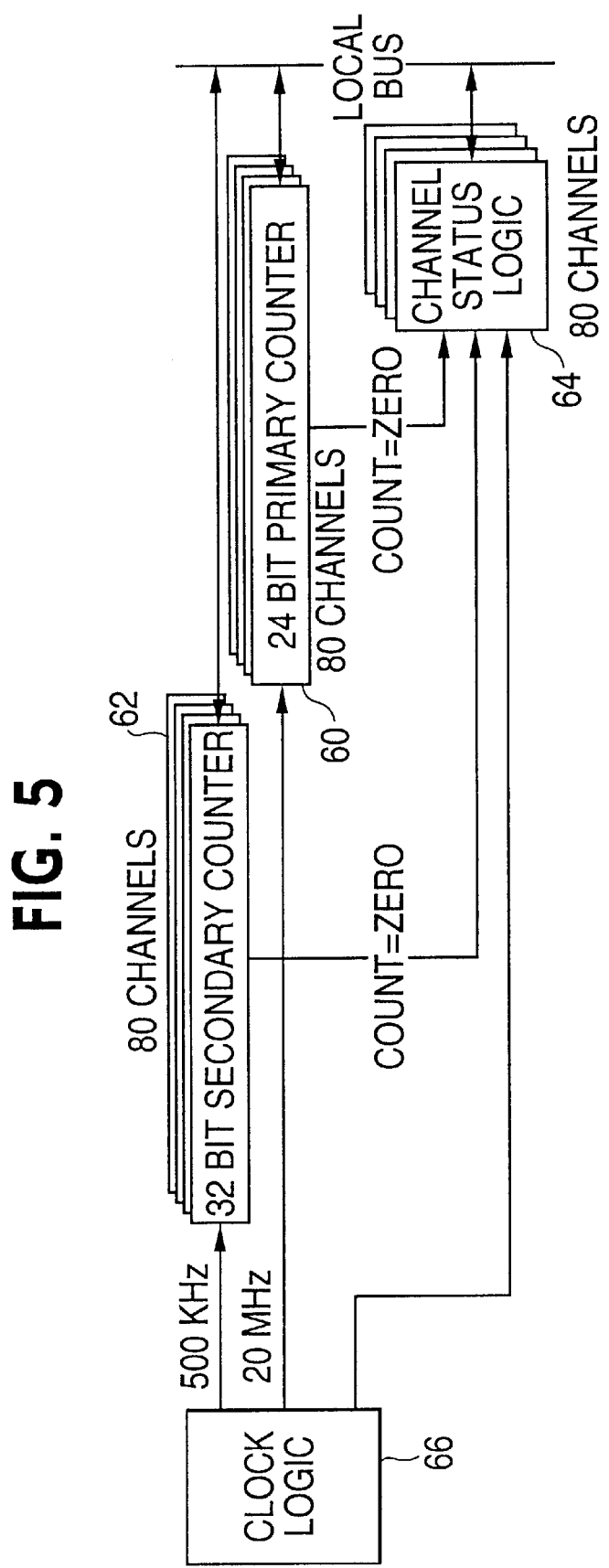
FIG. 5 is a block diagram of channel timing counters in a video streaming device according to the present invention.

The basic architecture of channel timing module 40 is shown in FIG. 5. Primary and secondary counters 60, 62 and status logic 64 are replicated for each of the 80 channels supported by video pump 12. Channel timing logic is used to generate timing signals marking the transfer of two Transport Packets (376 bytes) from video pump 12. These timing signals are of course based upon the data rate for each individual channel.

The basic operation of the channel timing logic utilizes primary and secondary counters 60, 62 as timers to generate a timing mark for video pump 12. The counters 60, 62 are loaded with a value such that the time to count to zero is equal to the time for 376 bytes (3008 bits) to be "pumped" at the desired data rate. This time is marked by setting a channel ready bit when the counter reaches zero. The counter then rolls over to the preset value (modulo n counter, where n is the value set upon initialization of the channel). The video pump polls the channel ready bits to determine when to "pump" the data by reading it from the DRAM buffer and passing it to ATM adapter module 36.

If counters 60, 62 use the same clock as used to read buffers 36, then it is easy to synchronize counters 60, 62 with the reading of the buffers. If a separate clock is used, clock logic 66 must be designed to handle asynchronous operation of the timers and reading of the registers. The design must also assure that channel ready bits are not "dropped" during the read operation by real-time pump 34.

The end of the counted time marks notification to real-time pump 34 to transfer a data block for this channel. This formula can also be expressed as:

$$\text{count} * \text{counter clock period} = 3008 \text{ bits/required bit rate}$$

This can be used to calculate the value required to be loaded into the counter.

$$\text{count} = \text{time for transfer/counter clock period}$$

or $$\text{count} = (3008/\text{required bit rate})/\text{counter clock period}$$

Utilizing realistic clock frequencies (<100 MHZ), it is not possible to reconstruct the data rates with required accuracy if a single counter is used.

This leads to a two counter architecture, as illustrated in FIG. 5. In this architecture, primary counter 60 gets as close as it can to the desired rate. The count is rounded down to generate a shorter time period and lower data rate than desired. The secondary, or remainder counter 62 is then used to "pick up the difference". Both counters set the channel ready bit individually for real-time pump 34, and the effective rate of the channel is simply the sum of the data rates generated by both of counters 60 and 62.

Figure 6:
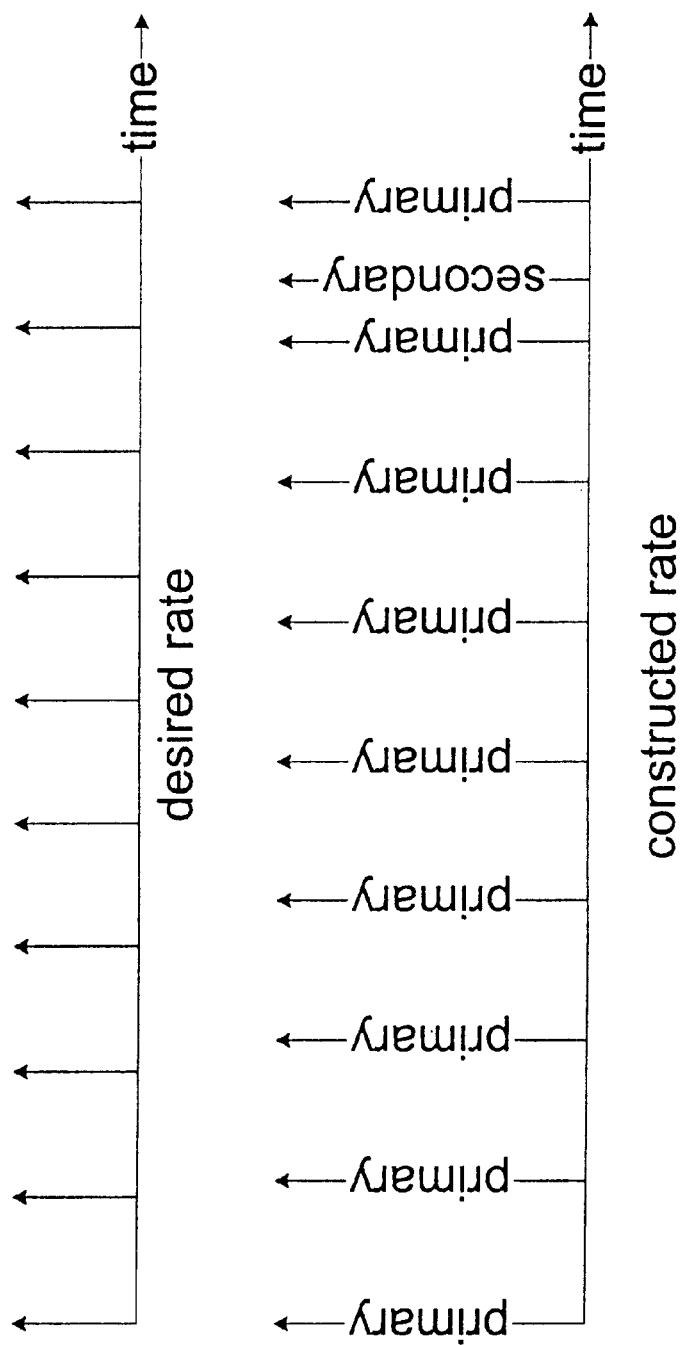
FIG. 6 is a data rate construction diagram.

A timing diagram for the two counter design is illustrated in FIG. 6. The arrows in FIG. 6 represent marks in time demarcating that data blocks are to be transferred. The top timing line represents the desired data rate. The bottom timing line represents the data rate as constructed by the two counter method used in video pump 12. The arrows labeled primary are timing marks generated by primary counter 60, while the arrow labeled secondary is a timing mark generated by secondary counter 62.

The timing marks from primary counter 60 appear on the timing line at a larger interval than the desired rate. This corresponds to a data rate from primary counter 60 that is less than the desired rate. Secondary counter 62 makes up the difference in the desired rate and the rate generated by primary counter 60.

Looking at the example, timing marks from the desired rate and the primary counter rate coincide every tenth period of the desired rate. During these ten periods of the desired rate, primary counter 60 produces 9 timing marks and secondary counter 62 generates one mark. The sum of the timing marks produced by primary and secondary counters 60, 62 thus is the same number of timing marks as the desired rate. Note that in actual operation, the periods are much longer, and the timing generated by primary counter 60 is skewed from the desired rate by a much smaller amount. This example was exaggerated for demonstration purposes.

The two counter design has been verified utilizing a 20 MHZ clock for primary counter 60 and a clock of 500 KHz for secondary counter 62. When these clock signals were supplied to 24 bit primary counters and 32 bit secondary counters satisfactory results were obtained, as illustrated in FIG. 7. The first column of the table is the data rate to be created, based on detection of the original rate from the PCRs, as discussed above. The second and third columns are the primary count value and the primary data rate generated with this count value. The fourth column, delta rate, shows how much the primary rate is off from the desired rate. The primary rate is always less than the desired rate, allowing the secondary counter to make up the difference. The packet slip column is for reference only, indicating how often (in seconds) a packet slip (data not at a set top device decoder when it needs to be) would occur if only the primary counter 60 were to be used. This also marks the period in which the data rates coincide, e.g., the length of time represented by ten periods of the desired rate illustrated in FIG. 6. The secondary count and secondary rate columns in FIG. 7 indicate the function of the secondary counters 62. The final rate is the sum of the primary and secondary rates. The last column shows the error of the data rates generated by this architecture.

Two points of interest in the table in FIG. 7 need to be pointed out. First, consider two "adjacent" data rates which have only 1 bps difference. The secondary counts for these two data rates are much greater than one, assuring the accuracy of the two counter concept.

Second, note that "singularities" will exist. These singularities occur when the primary count is equal to or very close to the desired rate. The rate of 500,000 bps in the table is just such a point. When the delta rate is too small for the secondary counter to respond to, the secondary counter will be disabled and the delta rate will be an error condition. These error conditions, however, will result in a packet slip time in excess of two hours. This is assured by the design itself, because the larger the count, the lower the data rate. By using a 32 bit counter with a clock of 500 KHz, for example, for the secondary counter 42, a maximum count yields a data rate of 0.35 bps, which produces a packet slip of 8589 sec or 2.39 hours. Thus, the maximum video playback length for the design illustrated in FIG. 5 is over two hours. If the maximum playback length needs to be longer, the design can be modified.

Figure 8:
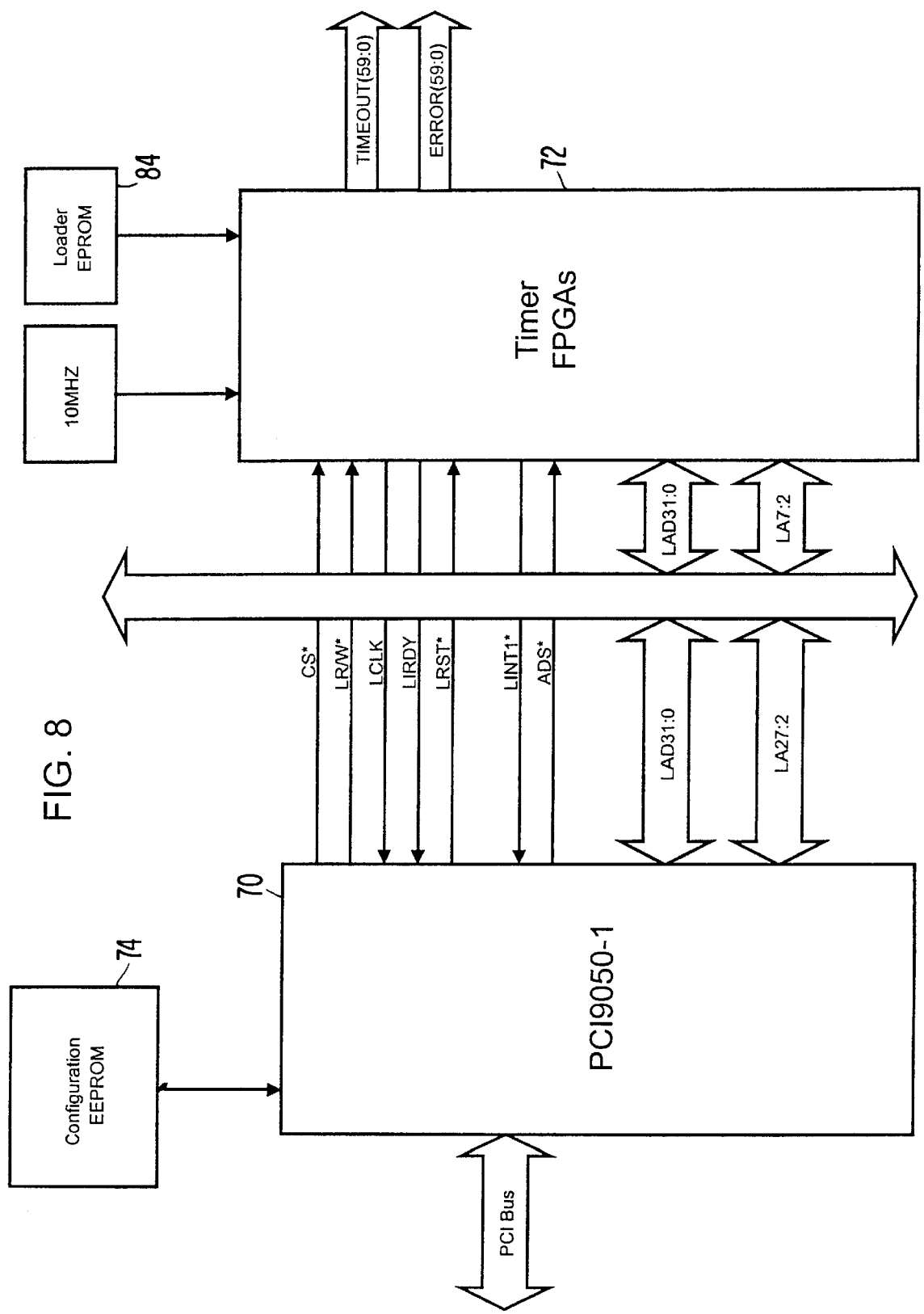
FIG. 8 is a flowchart of the operation of a video streaming device according to the present invention.
Figure 9:
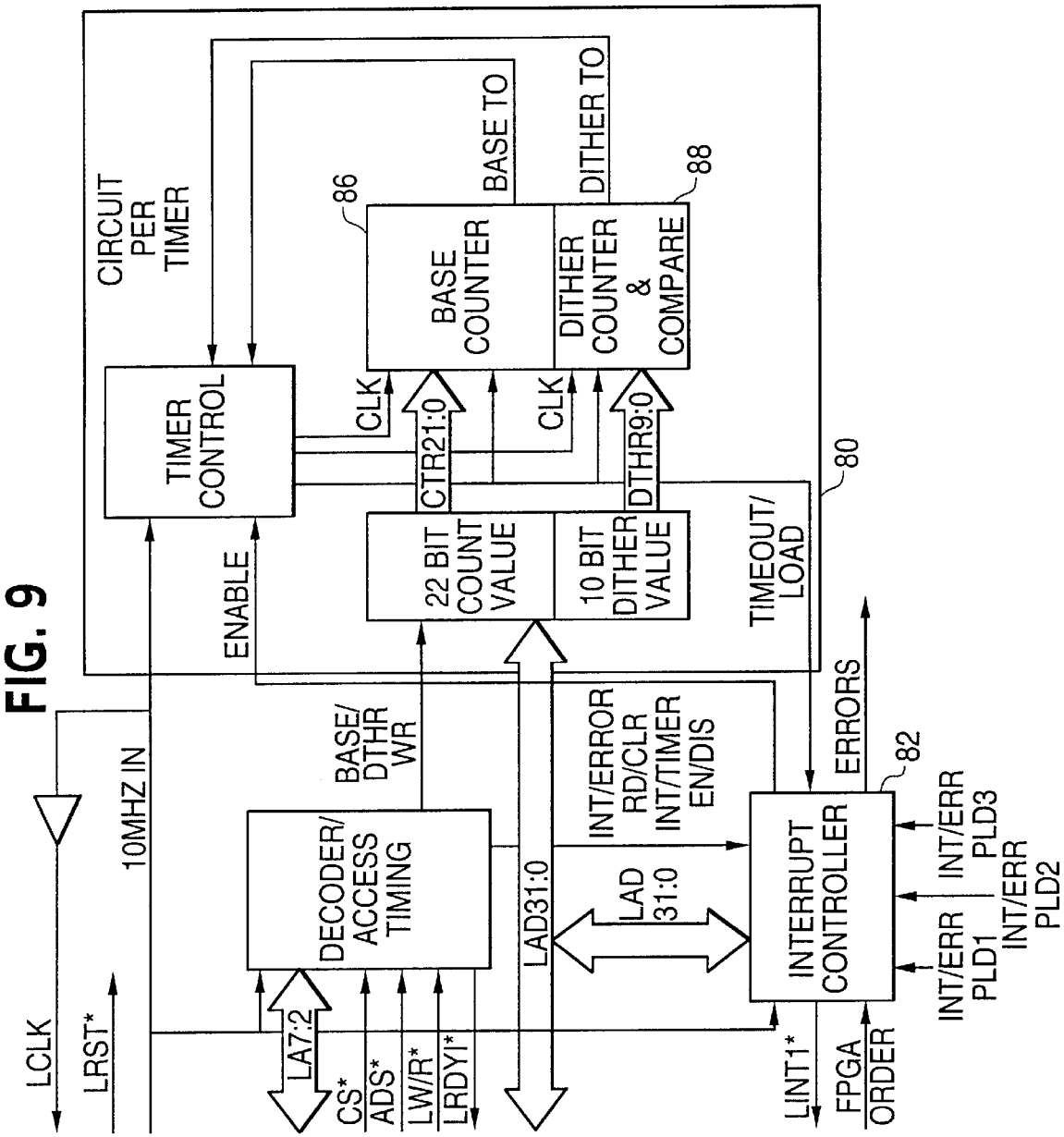
FIG. 9 is a block diagram of a digital media retrieval system using multiple video streaming devices to produce video streams with a total of 480 megabits per second.

An example of channel timing module 40 is provided in FIGS. 8 and 9. Operation of each of the timers in channel timing module 40 is initiated by processor 40 which loads the count data. Upon timeout an interrupt is generated for processor 40 which reads the interrupt status registers in channel status logic 64 to determine the source of the interrupt, i.e., which of the timers has reached terminal count or if an error condition exists.

A PCI interface 70, compliant to PCI Specification 2.1, may be provided by a PLX Technology PCI9050-1 PCI bus target interface. This device is a PCI slave interface providing a local bus bridge. PCI configuration registers in the channel timing module are mapped to I/O space. All resources on the PCI Timer card are preferably 32 bit accessible. The local bus clock runs at 10 MHz. Timing of local bus accesses are determined by timer FPGA 72.

The initial configuration of the channel timing module 40 is loaded from configuration EEPROM 74 attached to PCI interface 70. The following fields in the PCI configuration registers are loaded from configuration EEPROM 74 at power up: Device ID, Vendor ID, Class Code, Subsystem ID, Subsystem Vendor ID, and Interrupt Pin. These registers are reloaded at every instance of PCI Reset signal assertion. Configuration EEPROM 74 may be a Fairchild Semiconductor NM93CS46 which holds 1024 bits of information. The data within the device may be altered via registers within PCI interface 70, depending on the state of the protection register within EEPROM 74.

Several Altera EPF6024A FPGAs 72 are included in channel timing module 40. Each FPGA 72 contains 15 timers 80, one of which is illustrated in FIG. 9, interrupt controller 82 and a local bus interface. A block diagram of the Timer FPGA is shown in FIG. 9. Each timer FPGA is configured upon reset via loader EPROM 84, such as Altera EPC1441 devices each containing 400K×1 bits of information.

Each timer circuit 80 consists of two counters: base counter 86 and the dither counter 88. Base counter 86 is 22 bits, while dither counter 88 is 10 bits. These counters 86, 88 combine to provide an average timeout period as defined by the following formula:

$$\text{Period}=(\text{Base}*(1024-\text{Dither})+(\text{Base}+1)*\text{Dither})/(\text{Clk}*1024),$$

where
  Base=Base Counter Load Value,
  Dither=Dither Counter Load Value, and
  Clock=10 MHz Timer 80 will start counting upon load of base and dither counter values into base and dither counters 86, 88. This must be done as a single 32 bit write. Timer 80 may be stopped by writing all zeroes to the register. The value loaded into base counter 86 is the desired value minus one. A timeout occurs when base counter 86 reaches terminal count and dither counter 88 is less than or equal to the dither counter load value. The timeout is delayed by one clock cycle when dither counter 88 is greater than the dither counter load value. An interrupt will be generated on timeout of base counter 86 if the corresponding bit in the Interrupt Enable register is set. The local bus interface in each timer FPGA 72 provides the timing and address decode for accesses to resources of Timer FPGA 72. The local bus is clocked from the same 10 MHz source that drives the timers.

Figure 10:
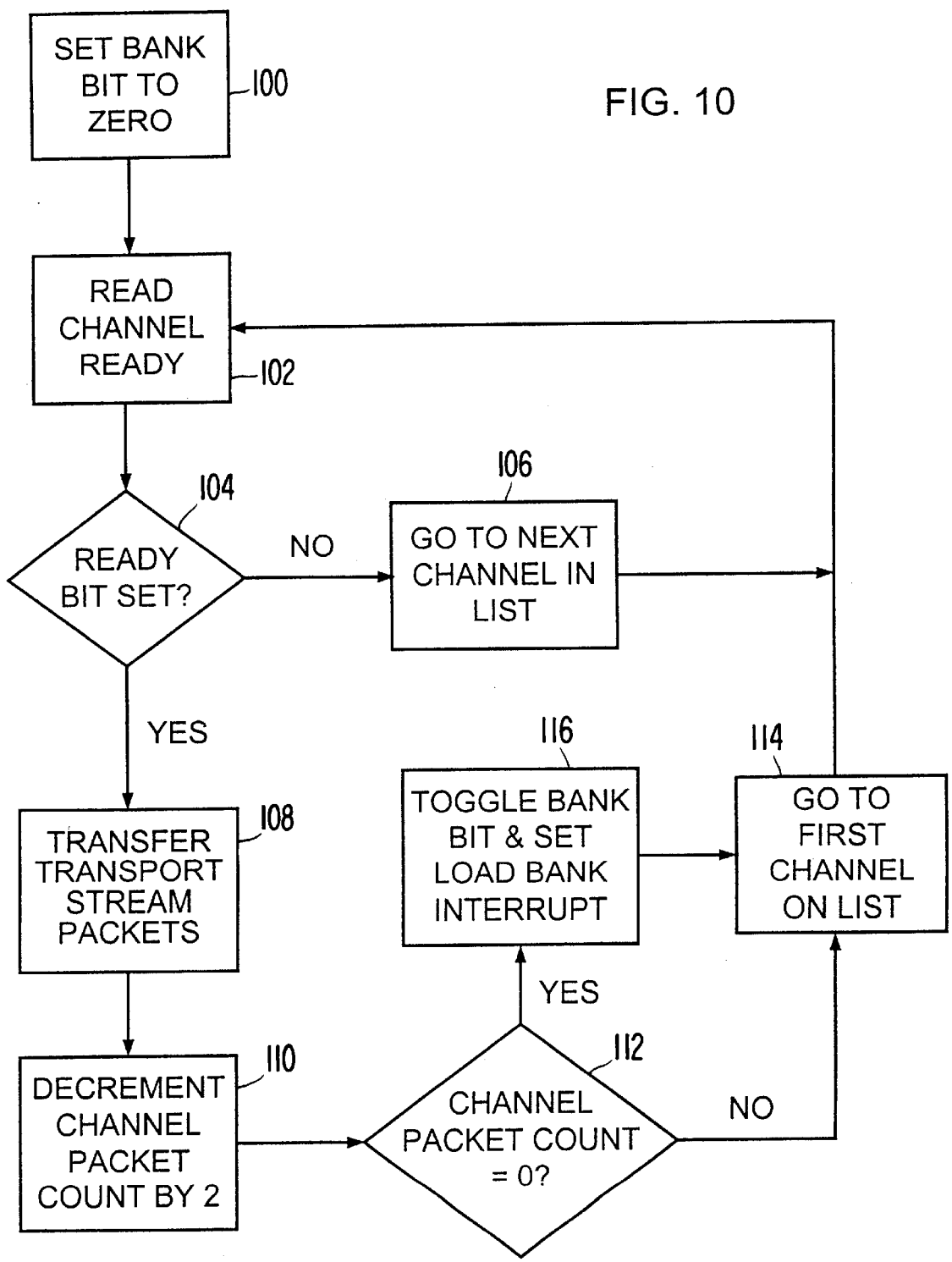
FIG. 10 is a flow chart of the operation of the real-time pump.

The operation of real-time pump 34 is illustrated in FIG. 10. After initialization 100, the next channel is checked 102 to see if it is ready to supply data. If the ready bit is determined 104 to be not set, the channel to be checked is incremented 106. If the channel is ready, two transport packets are transferred 108 to ATM adapter module 36 and the channel packet count is decremented 110 by two. If the channel packet count is not determined 112 to be zero, the next channel to be checked is set 114 to the first channel on the list. When the channel packet count is determined 112 to be zero, the bank bit is toggled and the load bank interrupt is set 116.

Figure 11:
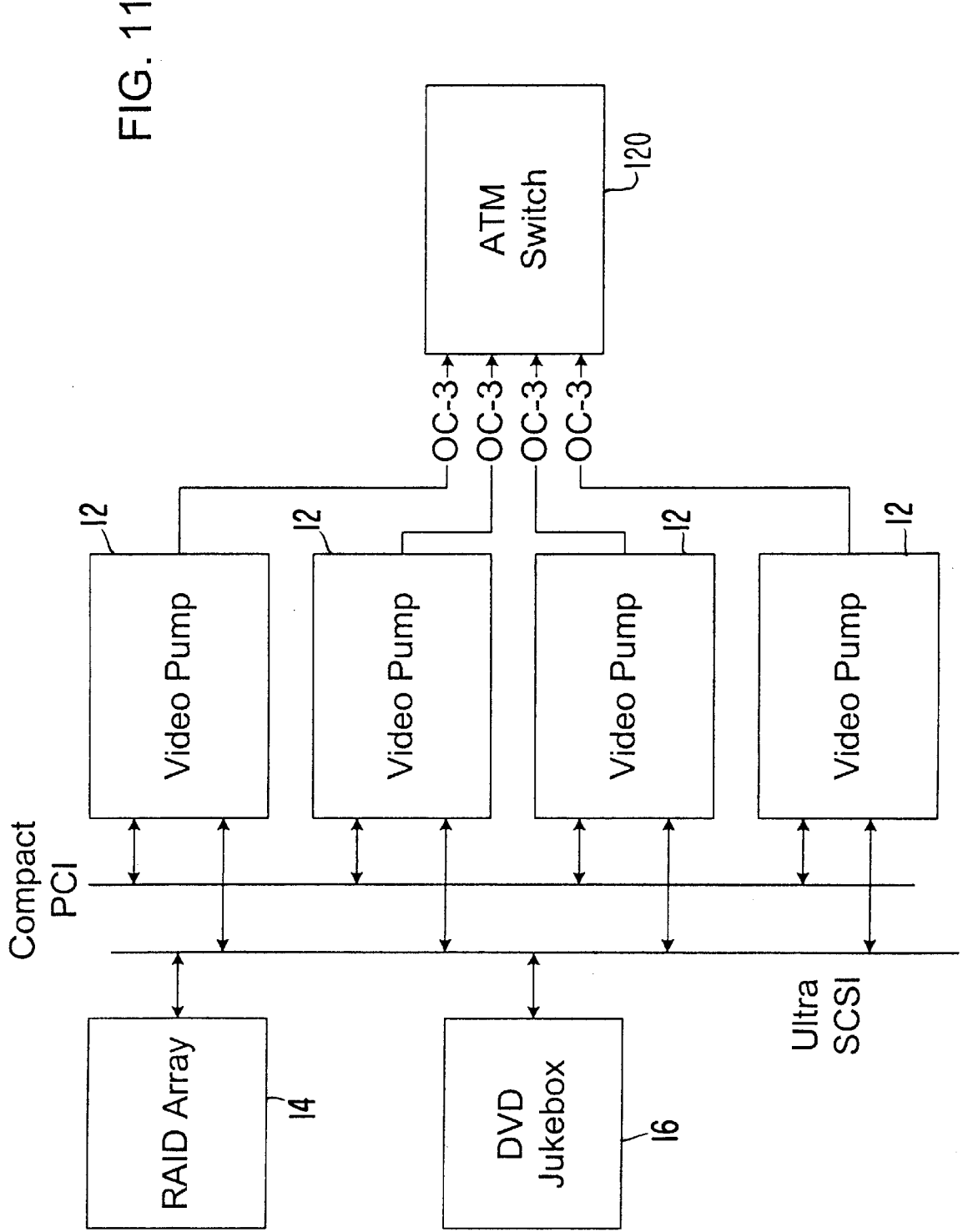
FIG. 11 is a block diagram of the video pumps connected to an ATM switch.

The present invention is scalable by combining multiple video pumps 12 connected to a single ATM switch 120, as illustrated in FIG. 11. Video pumps 12 may be connected to one or more storage devices, such as RAID array 14, DVD jukebox 16, and other devices, such as compact disc changers, not shown.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus for simultaneously reproducing multiple recordings from storage devices for transport on a network, comprising:

buffers to receive stored signals from the multiple recordings, each recording containing stored signals encoded at one of a plurality of bit rates;

a control unit, coupled to said storage devices, to receive requests to reproduce the multiple recordings and to control playback of the stored signals by the storage devices;

a real-time pump, coupled to said buffers and said control unit, to detect the one of the bit rates used to encode the stored signals on each of the multiple recordings and to output transport stream packets, each transport stream packet based on the stored signals from one of the multiple recordings; and a network interface, coupled to said control unit and said real-time pump, to receive the transport stream packets in corresponding queues and to output over the network multiplexed packet isochronous signals corresponding to the stored signals on the multiple recordings requested to be reproduced, each stream of the packet isochronous signals on the network having an average bit rate of the one of the bit rates used to encode the stored signals corresponding thereto.

2. The apparatus as recited in claim 1, wherein said network interface outputs each stream of the packet isochronous signals with the average bit rate within one bit per second of the one of the bit rates used to encode the stored signals corresponding thereto.

3. The apparatus as recited in claim 1, wherein said network interface outputs each stream of the packet isochronous signals with a jitter of less than two milliseconds.

4. The apparatus as recited in claim 1, further comprising a channel timing module, coupled to said real-time pump, to control timing of output of the transport stream packets.

* * * * *